United States Patent
Liu

(10) Patent No.: US 8,731,625 B2
(45) Date of Patent: May 20, 2014

(54) MOBILE TERMINAL AND METHOD OF WRITE PROTECTION FOR MEMORY CARD IN THE MOBILE TERMINAL

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 271 days.

(21) Appl. No.: 13/409,664

(22) Filed: Mar. 1, 2012

(65) Prior Publication Data

US 2012/0231730 A1     Sep. 13, 2012

(30) Foreign Application Priority Data

Mar. 11, 2011   (CN) .......................... 2011 1 0060148

(51) Int. Cl.
    *H04M 1/00*         (2006.01)
    *H04B 1/034*       (2006.01)
    *H04B 1/04*         (2006.01)

(52) U.S. Cl.
    USPC .......................... 455/575.8; 455/128; 455/129

(58) Field of Classification Search
    USPC ....................................... 455/575.8, 128, 129
    See application file for complete search history.

(56) References Cited

U.S. PATENT DOCUMENTS

2008/0018541 A1     1/2008    Pang et al.

FOREIGN PATENT DOCUMENTS

| | | |
|---|---|---|
| EP | 1 531 385 A2 | 5/2005 |
| EP | 2 280 490 A2 | 2/2011 |
| GB | 2 270 445 A | 3/1994 |

OTHER PUBLICATIONS

International Search Report, corresponding to PCT/IB2012/000399, mailed Jul. 10, 2012.
Written Opinion of the International Searching Authority, corresponding to PCT/IB2012/000399, mailed Jul. 10, 2012.
International Preliminary Report on Patentability, corresponding to PCT/IB2012/000399, mailed Sep. 26, 2013.

*Primary Examiner* — Yuwen Pan
*Assistant Examiner* — Xin Jia
(74) *Attorney, Agent, or Firm* — Renner, Otto, Boisselle & Sklar, LLP

(57) ABSTRACT

A mobile terminal and method to write protect a memory card in the mobile terminal. The mobile terminal comprises a body, a battery and a battery cover. The battery cover has a short-circuit connecting member. A memory card socket accommodates a pluggable memory card. A writing control unit has input and output ports, and when the battery cover is jointed with the body, the input and output ports contact the short-circuit connecting member to form a short-circuit connection therebetween; the writing control unit detects whether the battery cover is removed by outputting a test signal from the output port and detecting for the test signal at the input port; if the battery cover is removed, the test signal is not detected at the input port and data is prohibited from being written into the memory card.

13 Claims, 4 Drawing Sheets

MOBILE TERMINAL AND METHOD OF WRITE PROTECTION FOR MEMORY CARD IN THE MOBILE TERMINAL

TECHNICAL FIELD

The present invention relates to the field of electronic technology, and particularly, to a mobile terminal, and a method of write protection for a memory card in the mobile terminal.

DESCRIPTION OF THE RELATED ART

A smartphone with an independent operating system, used like a personal computer, can support the user to self-install programs such as software and games provided by a third party service provider, and can continually extend the functions of the smartphone through such programs. Thus the smartphone becomes more and more popular. Since various software may be self-installed by the user, the memory capacity of the smartphone per se often does not meet the demand for memory space. For this reason, the smartphone is usually provided with a memory card socket, so as to extend the memory space of the smartphone by inserting a pluggable memory card into the memory card socket. Thus, the memory card is of vital importance to the smartphone. In the current market, conventional memory cards for a smartphone, for example, include Multimedia Card (MMC), Secure Digital Memory Card (SD card) and TransFlash (TF) card, in which the SD card includes standard SD card, Elite Pro high speed card, miniSD card (also called as uSD card) and ultra speed SD card, etc.

In some versions (e.g., Android 2.2 and above) of the operating system of a smartphone, application programs in the internal Flash can be written into the memory card. If the memory card is pulled out when a program is being written into the memory card, at least some data will not be successfully written into the memory card during the process of writing the program into the memory card, and a data loss will be caused, which may cause the memory card to be unusable, i.e., there is a risk of corrupting the memory card, and the return rate of the memory card is increased.

SUMMARY OF THE INVENTION

The present invention is proposed with respect to the above problem in the prior art. The present invention is related to a mobile terminal and a method of write protection for a memory card in the mobile terminal capable of stopping writing data into the memory card in time when the memory card is pulled out, so as to effectively provide a protection of the writing operation on the memory card.

According to an aspect of the present invention, a mobile terminal is provided, including a body, a battery and a battery cover, wherein the battery cover is provided with a short-circuit connecting member; the body includes: a memory card socket configured to accommodate a pluggable memory card; and a write control unit, when the battery cover is jointed with the body, an input port and an output port of the writing control unit can both electrically contact the short-circuit connecting member, so as to form a short-circuit connection between the input port and the output port; wherein, the writing control unit detects whether the battery cover is removed by outputting a test signal from the output port and detecting the test signal at the input port; it is determined that the battery cover is removed when the test signal is not detected at the input port, and then data is prohibited from being written into the memory card.

According to another aspect, when the test signal is detected at the input port, the writing control unit determines that the battery cover is not removed, and allows data to be written into the memory card.

According to another aspect, the body further includes a communication module. According to another aspect, the short-circuit connecting member is an antenna of the communication module in the mobile terminal.

According to another aspect, the communication module is a Bluetooth module or a Wireless Local Area Network (WLAN) communication module.

According to another aspect, the body further includes a state detection unit configured to detect whether the communication module is under an working state.

According to another aspect, the writing control unit is further configured to detect regularly or at a time when there is data to be stored into the memory card, whether the battery cover is removed, in case the state detection unit detects that the communication module is not under the working state.

According to another aspect, the writing control unit is further configured to stop a detection of the battery cover and/or allow data to be written into the memory card, in case the state detection unit detects that the communication module is under the working state.

According to another aspect, the body further includes a switching unit connected to the antenna, the writing control unit and the communication module, and configured to switch an operation mode of the antenna into a communication mode or a detection mode, so that the communication module is connected to the antenna under the communication mode, while the input port and the output port of the writing control unit are in short-circuit connection via the antenna under the detection mode.

According to another aspect, the body further includes a state detection unit configured to detect whether the communication module is under an working state.

According to another aspect, the writing control unit is further configured to control the switching circuit to switch into the detection mode, in case the state detection unit detects that the communication module is not under the working state.

According to another aspect, the writing control unit stops a detection of the battery cover and/or allows data to be written into the memory card, in case the state detection unit detects that the communication module is under the working state. According to another aspect, the state detection unit detects the working state of the communication module by detecting a signal strength of the antenna; the switching unit is further configured to switch the operation mode of the antenna into the detection mode, in case the state detection unit detects that the signal strength of the antenna is lower than a predetermined threshold or a decrement of the signal strength is larger than a predetermined threshold.

According to another aspect of the present invention, a method of write protection for a memory card in a mobile terminal is provided, the mobile terminal includes a body, a battery and a battery cover, and the body is provided with a memory card socket configured to accommodate a pluggable memory card, wherein the battery cover is provided with a short-circuit connecting member, the method comprising: a short-circuit forming step that forms a short-circuit connection between a first port and a second port provided on the body, via the short-circuit connecting member on the battery cover when the battery cover is jointed with the body; a short-circuit detecting step that determines whether the short-circuit connection is disconnected by detecting at the second port, a test signal input from the first port, so as to determine whether the battery cover is removed from the body; a write protection step that prohibits data from being written into the memory card when it is determined that the battery cover is removed from the body.

According to another aspect, the write protection step further includes: allowing data to be written into the memory card when it is determined that the battery cover is not removed from the body.

According to another aspect, the body further includes a communication module. According to another aspect, the short-circuit connecting member is an antenna of the communication module.

According to another aspect, the method further includes a state detecting step that detects whether the communication module is under an working state.

According to another aspect, the short-circuit detecting step is performed regularly or at a time when there is data to be stored into the memory card, in case it is detected in the state detecting step that the communication module is not under the working state.

According to another aspect, the method further includes: allowing data to be written into the memory card in case it is detected in the state detecting step that the communication module is under the working state According to another aspect, the method further includes: during a period in which the communication module is under the working state, performing the short-circuit detecting step in case a signal strength of the antenna of the communication module is lower than a predetermined threshold or a decrement of the signal strength of the antenna is larger than a predetermined threshold.

Features described and/or illustrated with respect to one embodiment can be used in one or more other embodiments in a same or similar way, and/or combine with or replace features in other embodiments. To be noted, the term "include/comprise/have" herein refers to existence of feature, component, step and assembly, not excluding existence or addition of one or more other features, components, steps, assemblies or a combination thereof.

Many aspects of the present invention can be understood better with reference to the following drawings. The constituent parts of the drawings are not necessarily drafted in proportion or to scale, but are presented just for illustrating the present invention more clearly. For the convenience of illustrating and describing some parts of the present invention, and promoting the understanding of the embodiments, some parts of the drawings may be enlarged, e.g., enlarging those parts with respect to other parts in an exemplary apparatus practically manufactured according to the present invention. Elements and features described in a drawing or embodiment of the present invention can be combined with elements and features illustrated in one or more other drawings or embodiments. In addition, same or corresponding reference signs are used to represent same or corresponding constituent parts in all the drawings, and they also can be used to represent same or corresponding constituent parts in more than one of the embodiments.

BRIEF DESCRIPTION OF THE DRAWINGS

The accompanying drawings constitute a part of the specification, illustrate the embodiments of the present invention and together with the description serve to explain the present invention. The drawings described as follows illustrate several exemplary embodiments of the present invention, and a person skilled in the art can obtain other drawings based on these drawings without paying any creative effort. In the drawings.

DETAILED DESCRIPTION OF THE PREFERRED EMBODIMENTS

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

To be noted, in order to avoid the present invention from being vague due to unnecessary details, the drawings only illustrate device structure and/or processing step closely associated with the solution of the present invention, and other details not so necessary to understand the present invention are omitted.

In the design of some cell phones, the memory card socket is physically provided on an inner side of the battery cover of the cell phone (i.e., the side closer to the battery). Thus, the battery cover would be removed before the memory card is inserted or pulled out. For such designs of the cell phone, the present invention determines whether the memory card has a risk of being pulled out by detecting whether the battery cover is opened (i.e., removed). If the battery cover is not opened, the memory card will not be pulled out, and a program and/or other data can be safely written into the memory card. If the battery cover is opened, the memory card has a risk of being pulled out and the program and other data will be stopped from being written into the memory card, so as to realize a write protection of the memory card in the cell phone. In the embodiment of the present invention, the memory card may be MMC card, SD card, various memory sticks or any other type of pluggable memory card that can be used in the cell phone.

Next, a cell phone will be taken as an example to describe the solution of the present invention that protects the memory card more detailedly. However, it shall be appreciated that the present invention is applicable to not only a cell phone, but also a PDA and other mobile terminal using a memory card in configuration that the battery cover of such mobile terminals needs to be opened before the memory card is pushed in or pulled out.

Embodiment 1

Figure 1:
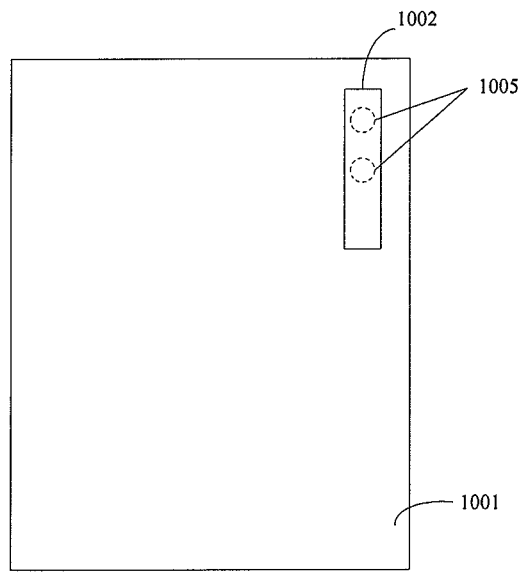
FIG. 1 is a schematic diagram of a battery cover provided with a short-circuit connecting member in an embodiment of the present invention.

In this embodiment, it is detected whether a battery cover of the cell phone is opened through a short-circuit connecting member provided on the battery cover. In this embodiment, the cell phone includes a body, a battery and a battery cover 1001. The battery cover 1001 is provided with a short-circuit connecting member 1002, as illustrated in FIG. 1. The short-circuit connecting member 1002 may be made of a metal material (including a alloy), or a non-metal conductive material such as carbon fiber. The short-circuit connecting member 1002 is preferably, but not limited to, a strip or strap-shaped sheet. It may be bonded onto the battery cover through an adhesive material, or formed on the battery cover through metal insert molding or deposition. For example, the metal sheet 1002 may be provided on the inner surface, the outer surface or the inside of the battery cover. In case of being provided on the outer surface or the inside of the battery cover, the metal sheet 1002 exposes two connecting contact points (also called as connection pads) 1005 on the inner surface of the battery cover.

Figure 2:
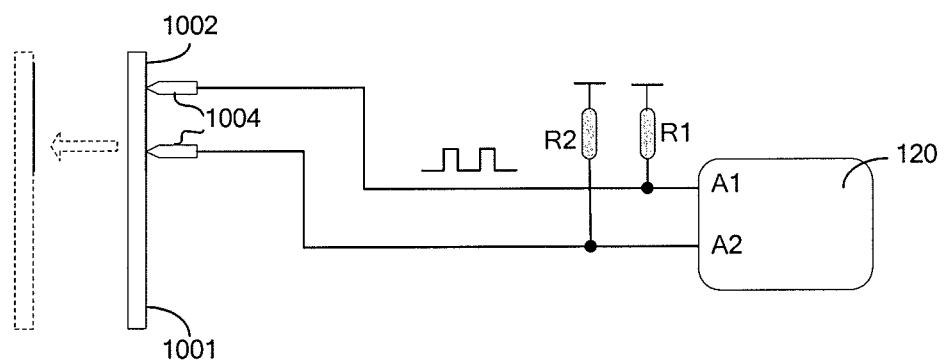
FIG. 2 is a schematic diagram of a battery cover detection apparatus in an embodiment of the present invention.

In this embodiment, the body of the cell phone includes not only a memory card socket (not illustrated) for accommodating the memory card and conventional components (e.g., processor, display, input unit and communication module), but also a writing control unit 120, as illustrated in FIG. 2. The writing control unit 120 includes an output port A1 and an input port A2. When the battery cover is jointed with (e.g., attached to, connected to) the body of the cell phone, the output port A1 and the input port A2 of the writing control unit 120 electrically contact the short-circuit connecting member 1002, so as to form a short-circuit connection between the output port A1 and the input port A2. The output port A1 and the input port A2 may electrically contact the short-circuit connecting member 1002 through terminals 1004 (e.g., but not limited to, pogo pins or spring fingers). When the battery cover 1001 is removed from the body of the cell phone (as illustrated by the dotted line in FIG. 2), the short-circuit connecting member 1002 no longer contacts the output port A1 or the input port A2, thus the short-circuit connection between the output port A1 and the input port A2 is disconnected.

In this embodiment of the present invention, when it is to be detected whether the battery cover is removed, the writing control unit 120 may output a test signal at the output port A1 and detect (i.e., receive) the test signal at the input port A2. The test signal for example may be, but not limited to, square wave, sine wave, triangular wave or sawtooth wave. When the test signal is detected (i.e., received) at the input port A2, it means that the short-circuit connection between the output port A1 and the input port A2 is not disconnected, and thus the battery cover is not removed. When the test signal is not detected (i.e., received) at the input port A2, it means that the short-circuit connection between the output port A1 and the input port A2 is disconnected, and thus the battery cover is removed. In case the battery cover is removed, the user may pull out the memory card. In order to prevent data loss and memory card corrupting caused by writing data into the memory card during the process of pulling out the memory card, the writing control unit 120 prohibits (including stopping) a program or other data from being written into the memory card when it is determined that the battery cover is removed, and allows the program or other data to be written into the memory card when it is determined that the battery cover is not removed.

In FIG. 2, pull-up resistors R1 and R2 may be used to pull up the levels of the ports A1 and A2. The resistances of the pull-up resistors R1 and R2 may be the same or different from each other. For example, the pull-up resistors R1 and R2 may be 5.2 KΩ, respectively. This value is just exemplary, and other values may be set in practice.

In an embodiment of the present invention, the writing control unit 120 may regularly (e.g., at an interval of 0.1 s, 0.5 s or 1 s; these values are just exemplary, and other values may be adopted) send a test signal through the output port A1, determine whether the battery cover is removed by checking whether the test signal is received at the input port A2, and correspondingly control (prohibits or allows) the data such as a program to be written into the memory card.

In another embodiment of the present invention, the writing control unit 120 may be started only when data (e.g., program, application or other data) is to be written into the memory card. The writing control unit 120 sends a test signal through the output port A1, and determines whether the battery cover is removed by checking whether the test signal is received at the input port A2. The writing control unit 120 allows the data to be written into the memory card when it is determined that the battery cover is not removed, or prohibits (including stopping) the data from being written into the memory card when it is determined that the battery cover is removed.

By detecting the battery cover, the writing control unit 120 as mentioned above effectively provides a write protection when the battery cover is opened. Thus, the corrupting of the memory card and the failure in running of an application program caused by the data writing error can be prevented, the data writing security of the memory card is improved, and the return rate of the memory card is effectively reduced.

Figure 3:
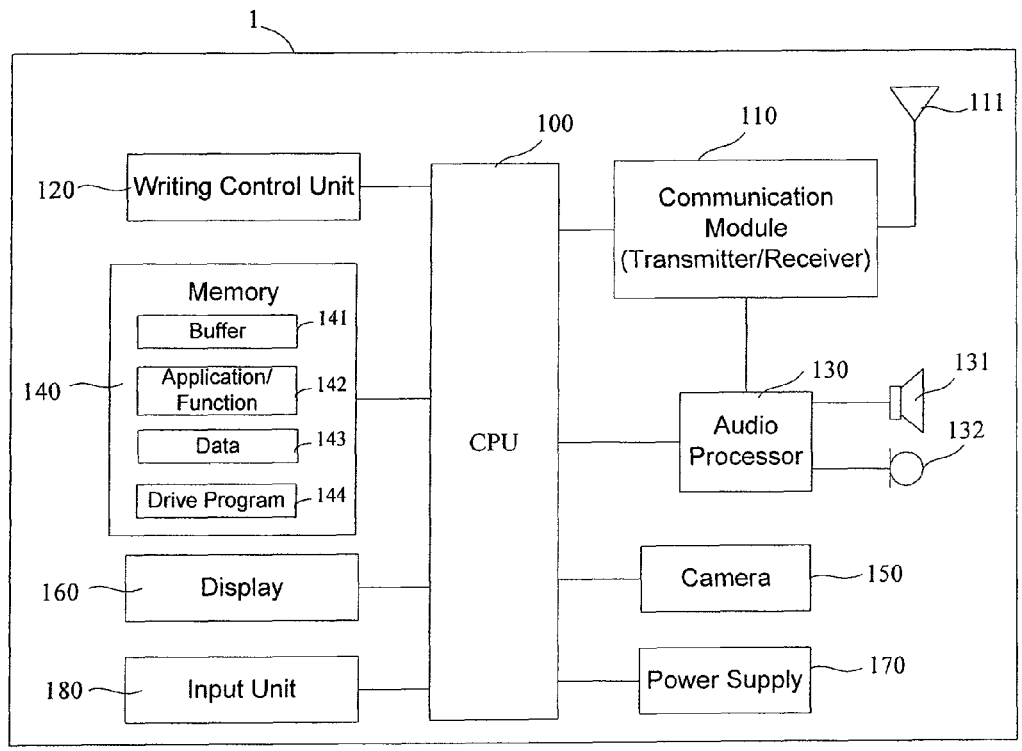
FIG. 3 is a block diagram of a cell phone in an embodiment of the present invention.

FIG. 3 is a block diagram of a cell phone 1 in an embodiment of the present invention, including the aforementioned writing control unit 120. This drawing is exemplary and other types of structures may be used to replace the illustrated structure, so as to realize the telecom function or other functions. As illustrated in FIG. 3, the cell phone 1 includes a CPU 100, a communication module 110, a writing control unit 120, an audio processor 130, a memory 140, a camera 150, a display 160, an input unit 180 and a power supply 170. The CPU 100 (sometimes called as a controller or an operation control, and may include a microprocessor or other processor device and/or logic device) receives an input and controls operations of respective parts of the cell phone 1. The input unit 180 provides an input to the CPU 100. The input unit 180 for example is a key or a touch input device. The camera 150 is configured to take image data and provide it to the CPU 100 for a conventional usage, e.g., storage, transmission, etc.

The power supply 170 is configured to supply power to the cell phone 1. The display 160 is configured to display an object to be displayed, such as images and text. The display 160 for example may be, but not limited to, an LCD display. The input unit 180 for example may be the key itself and/or a signal regulating circuit, a decoding circuit or other appropriate circuit that provides the CPU 100 with information for operating one or more keys in a conventional way. The memory 140 is coupled to the CPU 100. The memory 140 may be a solid state memory, e.g., ROM, RAM, SIM card, etc. The memory 140 also may be such a memory that stores information even when the power is off and can be selectively erased and provided with more data. An example of the memory sometimes is called EPROM. The memory 140 further may be a device of other certain type. The memory 140 includes a buffer memory 141 (sometimes called as buffer). The memory 140 may include an application/function storage section 142 configured to store an application program or a function program, or operation flow of the cell phone 1 to be performed through the CPU 100. The memory 140 may further include a data storage section 143 configured to store data, such as contact list, digital data, picture, sound and/or any other data used by the cell phone 1. Various drive programs for performing the communication function of the cell phone 1 and/or other functions (e.g., message transfer application, address list application, etc.) of the cell phone 1 may be included in a drive program storage section 144 of the memory 140.

The communication module 110 is a transmitter/receiver 110 that transmits and receives signals via an antenna 111. The communication module (transmitter/receiver) 110 is coupled to the CPU 100 to provide an input signal and receive an output signal, which may be the same as the case of a conventional cell phone. Based on different communication technologies, a cell phone may be provided with multiple communication modules 110, e.g., cellular network module, bluetooth module and/or Wireless Local Area Network (WLAN) module, etc. The communication module (transmitter/receiver) 110 is also coupled to a loudspeaker 131 and a microphone 132 via an audio processor 130, so as to provide an audio output via the loudspeaker 131 and receives an audio input from the microphone 132, thus the conventional telecom functions can be realized. The audio processor 130 may include any appropriate buffer, decoder, amplifier, etc. In addition, the audio processor 130 is further coupled to the CPU 100, so that a sound recording can be performed on the cell phone through the microphone 132, and the sound stored in the cell phone can be played through the loudspeaker 131.

Embodiment 2

In the design of some cell phones, the antenna of a communication module such as the Bluetooth module or the WLAN module is provided on the battery cover of the cell phone. Based on such a design of some cell phones, the antenna of the communication module provided on the battery cover is used as the short-circuit connecting member 1002 in this embodiment.

Figure 4:
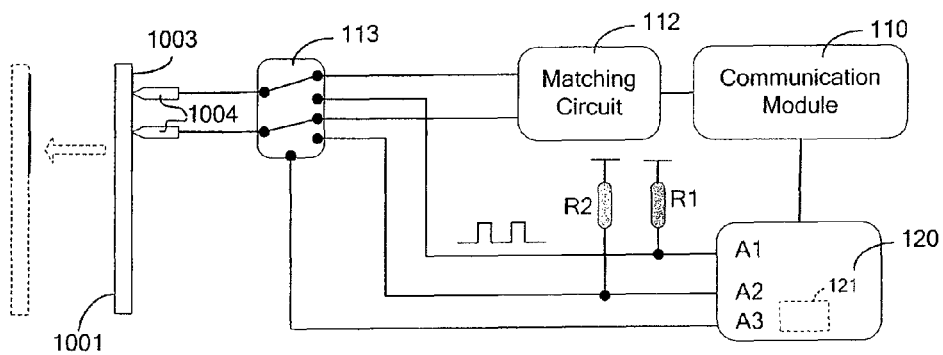
FIG. 4 is a schematic diagram of a battery cover detection apparatus in another embodiment of the present invention.

FIG. 4 is a schematic diagram of a battery cover detection apparatus in this embodiment. As illustrated in FIG. 4, the antenna 1003 of the communication module (e.g. the Bluetooth module or the WLAN module) provided on the battery cover is used as the short-circuit connecting member to perform a short-circuit connection between the output port A1 and the input port A2 of the writing control unit 120. The communication module 110 may be electrically connected to the antenna 1003 through two terminals 1004 (e.g., but not limited to, pogo pins or spring fingers) which also serve as the terminals for an electrical connection from the output port A1 and the input port A2 of the writing control unit 120 to the antenna. That is, the communication module 110 and the writing control unit 120 are connected to the antenna through the common terminals.

Figure 5:
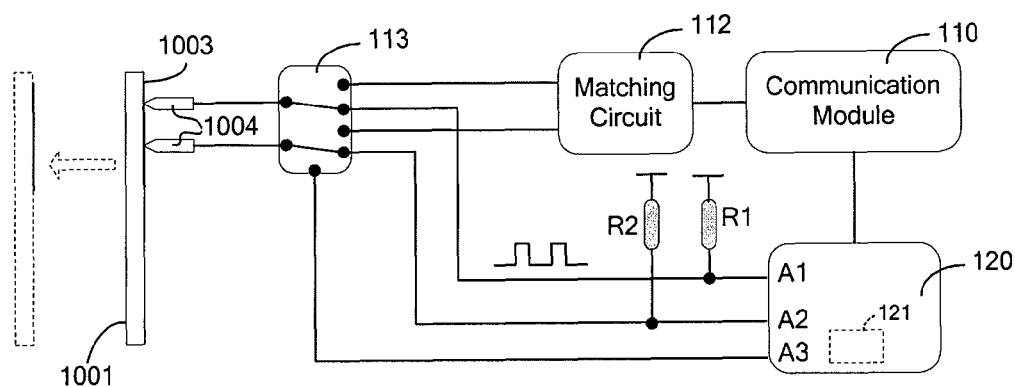
FIG. 5 is a schematic diagram of a battery cover detection apparatus in another embodiment of the present invention.

Reference is made to FIGS. 4 and 5. As illustrated in FIG. 4, a switching unit 113 is provided between the antenna 1003 and a matching circuit 112 of the communication module 110, and further is connected to the writing control unit 120, so as to switch the operation mode of the antenna 1003 into a communication mode (in which the antenna 1003 is connected to the matching circuit 112) or a detection mode (in which the antenna 1003 is connected to the input and output ports of the writing control unit 120). When the switching unit 113 switches the operation mode of the antenna into the communication mode (as illustrated in FIG. 4), a detection of the open or closed state of the battery cover cannot be carried out, and then it may be deemed that the battery cover detection function is disabled. When the switching unit 113 switches the operation mode of the antenna into the detection mode (as illustrated in FIG. 5), the detection of the open or closed state of the battery cover can be carried out, and then it may be deemed that the battery cover detection function is enabled. In an embodiment of the present invention, the writing control unit 120 may enable the switching unit 113 through a pin A3, so as to control the switching unit 113 to switch between the communication mode and the detection mode.

In case the communication module is under a working state, the antenna is under the communication mode and is being used. Since the antenna is provided on the battery cover, it can be determined that the battery cover is certainly in a closed state, i.e., jointed with the body of the cell phone. Thus, it is unnecessary to detect the battery cover at that time, and the writing control unit 120 may allow the data such as a program to be written into the memory card when the communication module is under the working state. In order to detect the working state of the communication module, the cell phone is further provided with a state detection unit 121 connected to the communication module and the writing control unit 120 or disposed in any one of the communication module and the writing control unit (FIG. 4 illustrates the case that the state detection unit 121 is disposed in the writing control unit), so as to detect whether the communication module is in the working state. When the state detection unit 121 detects that the communication module is in the working state, the writing control unit 120 no longer detects the state of the battery cover. In an embodiment of the present invention, the state detection unit 121 may detect the working state of the communication module by detecting the antenna signal quality (e.g., antenna signal strength, etc.) in the communication module or other parameter indicating that the antenna is being used.

In an embodiment of the present invention, when the state detection unit 121 detects that the communication module is not in the working state, the writing control unit 120 may control the switching unit 113 through the pin A3 to switch into the detection mode regularly (e.g., at an interval of 1 s (i.e., 1 second), 2 s, 3 s or other value), i.e., to enable the detection function for the battery cover. During a period in which the detection function is enabled, the writing control unit 120 may constantly or regularly (e.g., at an interval of 0.25 s, 0.5 s, 1 s or other value) send a test signal through the output port A1, determine whether the battery cover is removed by checking whether the test signal is received at the input port A2, and correspondingly control (prohibits or allows) the data such as a program to be written into the memory card.

In another embodiment of the present invention, in case the state detection unit 121 detects that the communication module is not in the working state, the writing control unit 120 may control the switching unit 113 through the pin A3 to switch into the detection mode only when data (e.g., program, application or other data) is to be written into the memory card, so that the writing control unit 120 detects whether the battery cover is removed, and correspondingly controls (prohibits or allows) the data such as a program to be written into the memory card.

Further, during a period in which the communication module is under the working state, there is a possibility that the antenna and the communication module may be disconnected from each other when the state detection unit 121 detects that the connection between the communication module and the network suddenly becomes worse, for example the signal quality declines sharply, e.g., the antenna signal strength is lower than a predetermined threshold (for example, but not limited to, −90 dBm) or the is variation of the antenna signal strength (for example the variation (decrement) between two antenna signal strengths detected successively) is larger than a predetermined threshold (for example, but not limited to, 20 dB). In that case, the writing control unit 120 may control the switching unit 113 through the pin A3 to switch into the detection mode, so as to detect whether the battery cover is removed, and correspondingly control (prohibits or allows) the data such as a program to be written into the memory card.

When the communication module 110 is to be used again for a communication, the communication module 110 may send an instruction signal to the writing control unit 120, which enables the switching unit 113 through the pin A3 to switch from the detection mode into the communication mode, so that the communication module 110 performs a communication through the antenna, and the writing control unit 120 stops detecting the battery cover at that time.

This embodiment also provides a write protection for the memory card, so as to prevent the corrupting of the memory card and a failure in running of an application program caused by a data writing error, improve the data writing security of the memory card, and effectively reduce the return rate of the memory card.

Figure 6:
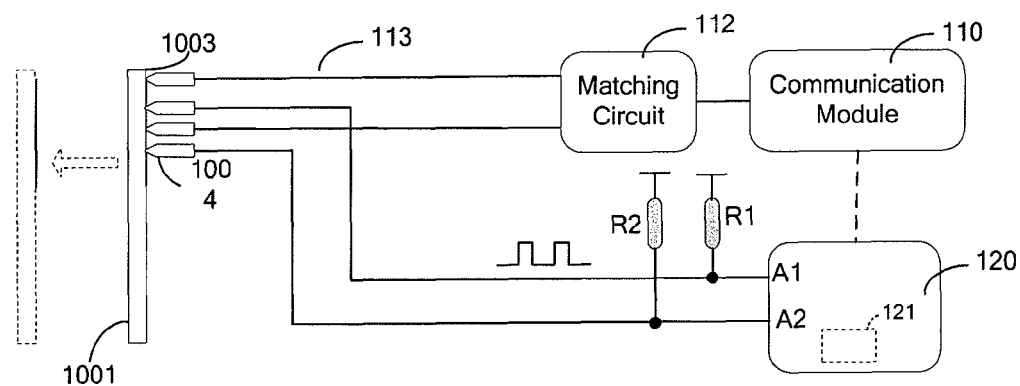
FIG. 6 is a schematic diagram of a battery cover detection apparatus in another embodiment of the present invention.

In another embodiment of the present invention, alternatively, the communication module 110 and the writing control unit 120 may be connected to the antenna through their respective terminals instead of the common terminals, so as to realize the communication function and the battery cover detection function, respectively, as illustrated in FIG. 6. In that case, the switching unit 113 and the pin A3 of the writing control unit 120 may be omitted. But the working state of the communication module 110 still can be detected through the state detection unit 121. In case the communication module 110 is under the working state, the writing control unit 120 may allow the data such as a program to be written into the memory card; while in case the communication module 110 is not under the working state, the writing control unit 120 may detect regularly (e.g., periodically) or at a time when there is data to be written into the memory card, whether the battery cover is removed and correspondingly control (prohibit or allow) the data such as a program to be written into the memory card.

Figure 7:
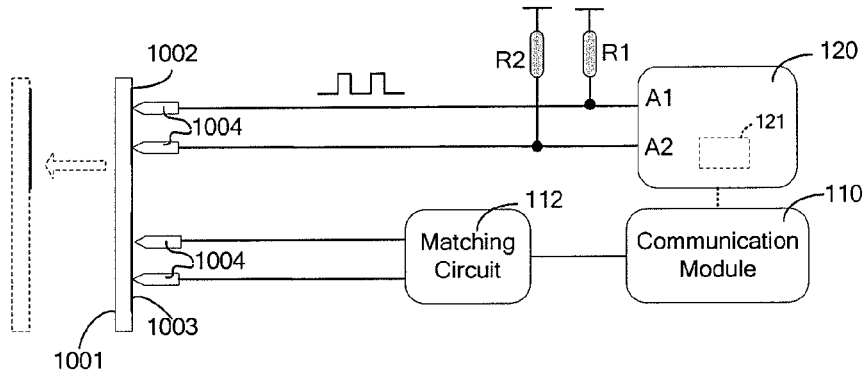
FIG. 7 is a schematic diagram of a battery cover detection apparatus in another embodiment of the present invention.

In another embodiment of the invention, the antenna 111 of the communication module 110 and the short-circuit connecting member 1002, which establishes a short-circuit connection between the output port A1 and the input port A2 of the writing control unit 120, may be separately provided at different positions on the battery cover 1001. In that case, the communication module 110 and the short-circuit connecting member 1002 may independently realize their respective functions, i.e., the communication function and the battery cover detection function, as illustrated in FIG. 7.

Figure 8:
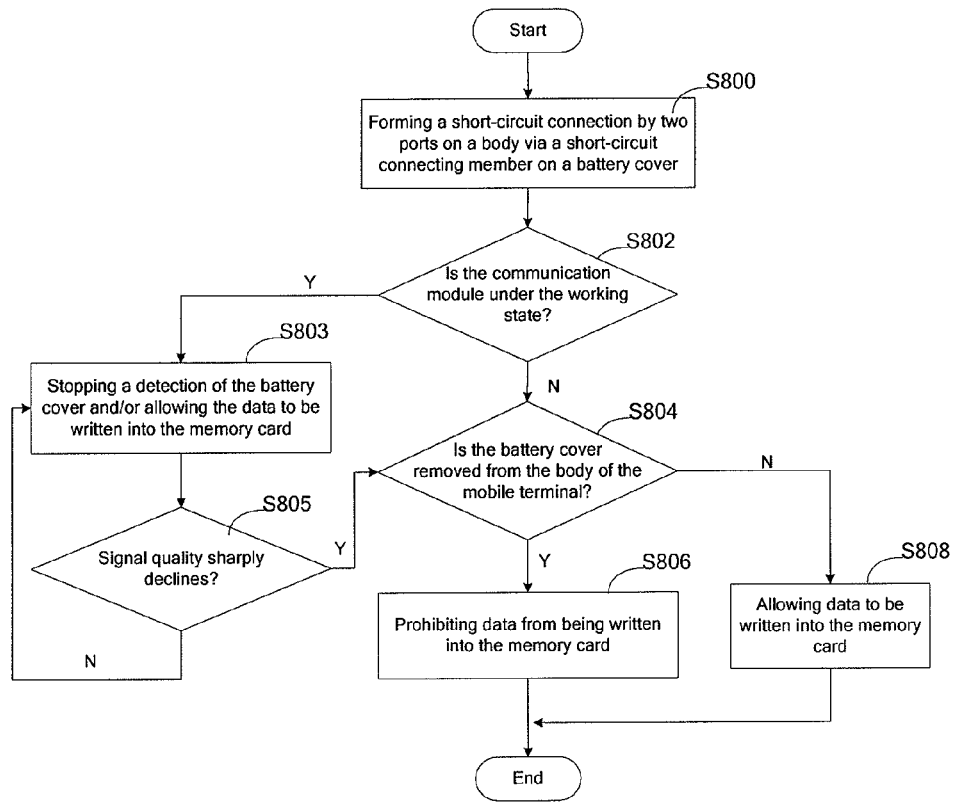
FIG. 8 is a flowchart of a write protection method of a memory card in an embodiment of the present invention.

Alternatively, the writing control unit 120 may be connected to the communication module 110 through the state detection unit 121, so that the writing control unit 120, according to the detection of the state detection unit 121, allows the data such as a program to be written into the memory card in case the communication module 110 is under the working state, while in case the communication module 110 is not under the working state, the writing control unit 120 detects regularly (e.g., periodically) or at a time when there is data to be written into the memory card, whether the battery cover is removed and correspondingly controls (prohibits or allows) the data such as a program to be written into the memory card. The state detection unit 121 may be connected to the communication module 110 and the writing control unit 120, or disposed in any one of the communication module 110 and the writing control unit 120. Alternatively, when the antenna of the communication module 110 and the short-circuit connecting member 1002 are provided separately, the antenna of the communication module 110 may be provided at other position on the body of the cell phone, instead of on the battery cover. The write protection method for the memory card in the embodiment of the present invention is described as follows in conjunction with the aforementioned structure of the cell phone. As illustrated in FIG. 8, the write protection of the memory card may be realized through the following steps:

S800: a short-circuit forming step that forms a short-circuit connection between a first port (e.g., the output port A1) and a second port (e.g., the input port A2) provided on the body of the cell phone, via a short-circuit connecting member on a battery cover when the battery cover is jointed with (e.g., attached to, connected to) the body.

The short-circuit connecting member for example may be a metal sheet or other conductive sheet. In an embodiment of the present invention, the short-circuit connecting member is an antenna of a communication module (e.g., Bluetooth module or WLAN communication module) of the cell phone.

S804: a short-circuit detecting step that determines whether the short-circuit connection is disconnected by detecting at the second port, a test signal input from the first port, so as to determine whether the battery cover is removed from the body. When the test signal from the first port is not detected at the second port, it is determined that the short-circuit connection is disconnected; and when the test signal from the first port is detected at the second port, it is determined that the short-circuit connection is not disconnected and the battery cover is not removed from the body of the cell phone.

S806: a write protection step that prohibits (including stopping) data from being written into the memory card when it is determined in the short-circuit detecting step that the battery cover is removed from the body.

In this way, the damage of the memory card and the failure in running of an application program, caused by the data writing error when the memory card is pulled out, can be prevented, the data writing security of the memory card is improved, and the return rate of the memory card is effectively reduced.

The method may further include: S808, allowing data to be written into the memory card when it is determined in the short-circuit detecting step that the battery cover is not removed from the body.

In case the short-circuit connecting member is the antenna of the communication module in the cell phone, the method may further include the following step before S804:

S802: a state detecting step that detects whether the communication module is under the working state.

For example, the working state of the communication module may be detected by detecting the signal strength of the antenna:

In that case, the short-circuit detecting step S804 will be performed regularly or at a time when there is data to be written into the memory card, in case it is determined in the state detecting step that the communication module is not under the working state.

The method may further include:

S803: stopping a detection of the battery cover and/or allowing the data to be written into the memory card, in case it is determined in the state detecting step that the communication module is under the working state.

In an embodiment of the present invention, the method may further include: step S805: during a period in which the communication module is under the working state, performing the short-circuit detecting step S804 when the signal strength of the antenna of the communication module is lower than a predetermined threshold or a decrement of the signal strength of the antenna is larger than a predetermined threshold.

The method of the present invention is not limited to be executed according to the time order as described herein, and can be executed sequentially, concurrently or independently in other time order. Thus, the execution order of the method as described herein does not constitute a limitation to the technical scope of the present invention.

The above descriptions and drawings illustrate various different features of the present invention. It shall be appreciated that a person skilled in the art can implement the above described and illustrated steps and processes by compiling appropriate computer codes.

The embodiments of the present invention are disclosed herein. A person skilled in the art will easily realize that the present invention has other applications under other environments. In fact, many other embodiments and implementations also exist. The accompanying claims do not intend to limit the scope of the present invention as the above embodiments.

Features described and/or illustrated with respect to one embodiment can be used in one or more other embodiments in a same or similar way, and/or combine with or replace features in other embodiments.

It shall be appreciated that multiple parts of the embodiments of the present invention can be implemented via hardware, software, firmware or a combination thereof. In the above embodiments, multiple steps or methods can be implemented through software or firmware stored in a memory and executable by an appropriate instruction execution system. For example, if the implementation is made through hardware, e.g., in alternate embodiments, the implementation may be made by combining any one or a combination of the following prior arts: discrete logic circuit having logic gate circuit for implementing logic function for digital signal, application specific integrated circuit (ASIC) having appropriate combined logic gate circuit, programmable gate array (PGA), Field Programmable Gate Array (FPGA), etc.

When all or a part of the steps in the above method are implemented by instructing relevant hardware through a program, the program may be stored in a computer readable storage medium, such as ROM/RAM, magnetic disk, optical disk, etc.

Any process or method description or block described in the flowchart or in other way can be understood as including one or more modules, segments or portions for implementing codes of executable instructions in steps of specific logic function or process, and the range of the preferred embodiments further include other implementations, wherein the functions may be executed other than the order illustrated or discussed, including a substantially simultaneous manner based on concerned function or an inverse order, and this shall be appreciated by a person skilled in the art.

The above embodiments make further and detailed descriptions of the object, technical solution and beneficial effect of the present invention. It shall be appreciated that, the above descriptions are just embodiments of the present invention, and do not limit the protection scope of the present invention. Any amendment, equivalent substitution, improvement, etc. made within the spirit and principle of the present invention shall be covered by the protection scope of the present invention.

What is claimed is:

1. A mobile terminal comprising a body, a battery and a battery cover, wherein,
    the battery cover is provided with a short-circuit connecting member;
    the body comprises:
        a memory card socket configured to accommodate a pluggable memory card;
        a writing control unit including an input port and an output port, the writing control unit configured such that, in response to the battery cover being joined with the body, the input port and the output port of the writing control unit both electrically contact the short-circuit connecting member, so as to form a short-circuit connection between the input port and the output port;
        wherein the writing control unit is configured to detect whether the battery cover is removed by outputting a test signal from the output port and detecting for the test signal at the input port, whereby it is determined that the battery cover is removed when the test signal is not detected at the input port and data is prohibited from being written into the memory card when the battery cover is removed;
        a communication module, wherein the short-circuit connecting member is an antenna of the communication module; and
        a state detection unit configured to detect whether the communication module is under a working state, wherein the writing control unit stops a detection of the battery cover and/or allows data to be written into the memory card if the state detection unit detects that the communication module is under the working state.

2. The mobile terminal according to claim 1, wherein,
    when the test signal is detected at the input port, the writing control unit determines that the battery cover is not removed, and allows data to be written into the memory card.

3. The mobile terminal according to claim 1, wherein,
    the communication module is a Bluetooth module or a Wireless Local Area Network communication module.

4. The mobile terminal according to claim 1, wherein the body further comprises:
    a state detection unit configured to detect whether the communication module is under an working state.

5. The mobile terminal according to claim 4, wherein, the writing control unit is further configured to detect regularly or at a time when there is data to be stored into the memory card, whether the battery cover is removed, in case the state detection unit detects that the communication module is not under the working state.

6. The mobile terminal according to claim 4, wherein,
    the writing control unit is further configured to stop a detection of the battery cover and/or allow data to be written into the memory card, in case the state detection unit detects that the communication module is under the working state.

7. The mobile terminal according to claim 1, wherein the body further comprises:
    a switching unit connected to the antenna, the writing control unit and the communication module, and configured to switch an operation mode of the antenna into a communication mode or a detection mode, so that the communication module is connected to the antenna under the communication mode, while the input port and the output port of the writing control unit are in short-circuit connection via the antenna under the detection mode.

8. The mobile terminal according to claim 1, wherein, the writing control unit is further configured to control the switching circuit to switch into the detection mode, in case the state detection unit detects that the communication module is not under the working state.

9. The mobile terminal according to claim 8, wherein, the state detection unit detects the working state of the communication module by detecting a signal strength of the antenna;

the switching unit is further configured to switch the operation mode of the antenna into the detection mode, in case the state detection unit detects that the signal strength of the antenna is lower than a predetermined threshold or a decrement of the signal strength is larger than a predetermined threshold.

10. A method of write protection for a memory card in a mobile terminal, the mobile terminal comprises a body, a battery and a battery cover, and the body is provided with a memory card socket configured to accommodate a pluggable memory card and a communication module, wherein the battery cover is provided with a short-circuit connecting member that is an antenna of the communication module, the method comprising:

a short-circuit forming step that forms a short-circuit connection between a first port and a second port provided on the body, via the short-circuit connecting member on the battery cover when the battery cover is joined with the body;

a state detecting step that detects whether the communication module is under a working state;

a short-circuit detecting step that determines whether the short-circuit connection is disconnected by detecting at the second port for a test signal input from the first port, so as to determine whether the battery cover is removed from the body; and a write protection step that prohibits data from being written into the memory card when it is determined that the battery cover is removed from the body, and wherein the write protection step further comprises allowing data to be written into the memory card in case it is detected that the communication module is under the working state.

11. The method according to claim 10, wherein the write protection step further comprises: allowing data to be written into the memory card when it is determined that the battery cover is not removed from the body.

12. The method according to claim 1, wherein, the short-circuit detecting step is performed regularly or at a time when there is data to be stored into the memory card, in case it is detected in the state detecting step that the communication module is not under the working state.

13. The method according to claim 12, further comprising: during a period in which the communication module is under the working state, performing the short-circuit detecting step in case a signal strength of the antenna of the communication module is lower than a predetermined threshold or a decrement of the signal strength of the antenna is larger than a predetermined threshold.

* * * * *